United States Patent
Kurihara

(10) Patent No.: US 10,433,149 B2
(45) Date of Patent: Oct. 1, 2019

(54) COMMUNICATION APPARATUS, METHOD OF CONTROLLING THE SAME, AND STORAGE MEDIUM

(71) Applicant: CANON KABUSHIKI KAISHA, Tokyo (JP)

(72) Inventor: Shukei Kurihara, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/455,951

(22) Filed: Mar. 10, 2017

(65) Prior Publication Data

US 2017/0280492 A1    Sep. 28, 2017

(30) Foreign Application Priority Data

Mar. 24, 2016  (JP) ................... 2016-060904

(51) Int. Cl.
*H04W 4/80* (2018.01)
*H04W 8/00* (2009.01)
*H04L 29/12* (2006.01)
*H04W 76/14* (2018.01)
*H04W 76/18* (2018.01)
*H04W 84/12* (2009.01)
*H04W 88/06* (2009.01)

(52) U.S. Cl.
CPC ......... *H04W 8/005* (2013.01); *H04L 61/2007* (2013.01); *H04W 4/80* (2018.02); *H04W 76/14* (2018.02); *H04W 76/18* (2018.02); *H04W 84/12* (2013.01); *H04W 88/06* (2013.01)

(58) Field of Classification Search
CPC .. H04L 61/2007; H04W 4/80; H04W 76/023; H04W 76/14; H04W 76/18; H04W 84/12; H04W 88/06; H04W 8/005
See application file for complete search history.

(56) References Cited

U.S. PATENT DOCUMENTS

| 6,996,555 B2 | 2/2006 | Muto et al. | |
| 2003/0120754 A1 | 6/2003 | Muto et al. | ............... 709/220 |
| 2004/0259552 A1* | 12/2004 | Ihori | ............... H04W 28/18 |
| | | | 455/445 |
| 2009/0323569 A1* | 12/2009 | Wentink | ............... H04W 48/10 |
| | | | 370/311 |

(Continued)

FOREIGN PATENT DOCUMENTS

| JP | 2000-339259 | 12/2000 |
| JP | 2000-339259 A | 12/2000 |

*Primary Examiner* — Kashif Siddiqui
(74) *Attorney, Agent, or Firm* — Venable LLP

(57) ABSTRACT

A technique for a communication apparatus to automatically connect to a device that has a function for wireless communication by an infrastructure connection and by a direct connection, in conformity with a connection setting of the device is provided. A mobile terminal (communication apparatus) searches for surrounding MFPs (devices) and accepts a selection by a user of an MFP by displaying, on the operation panel, a screen of a list of MFPs discovered by the search. The mobile terminal first performs an infrastructure connection to an MFP selected by the user in the list screen displayed on the operation panel. When the infrastructure connection to the selected MFP fails, the mobile terminal performs a direct connection to that MFP.

30 Claims, 9 Drawing Sheets

(56) References Cited

U.S. PATENT DOCUMENTS

| | | | | |
|---|---|---|---|---|
| 2015/0181487 A1* | 6/2015 | Konrad | ................ | H04W 76/14 |
| | | | | 370/329 |
| 2015/0358799 A1* | 12/2015 | Miyakawa | ............ | H04W 76/14 |
| | | | | 455/404.1 |
| 2016/0255501 A1* | 9/2016 | Van Phan | ............... | H04L 63/20 |
| | | | | 713/153 |

* cited by examiner

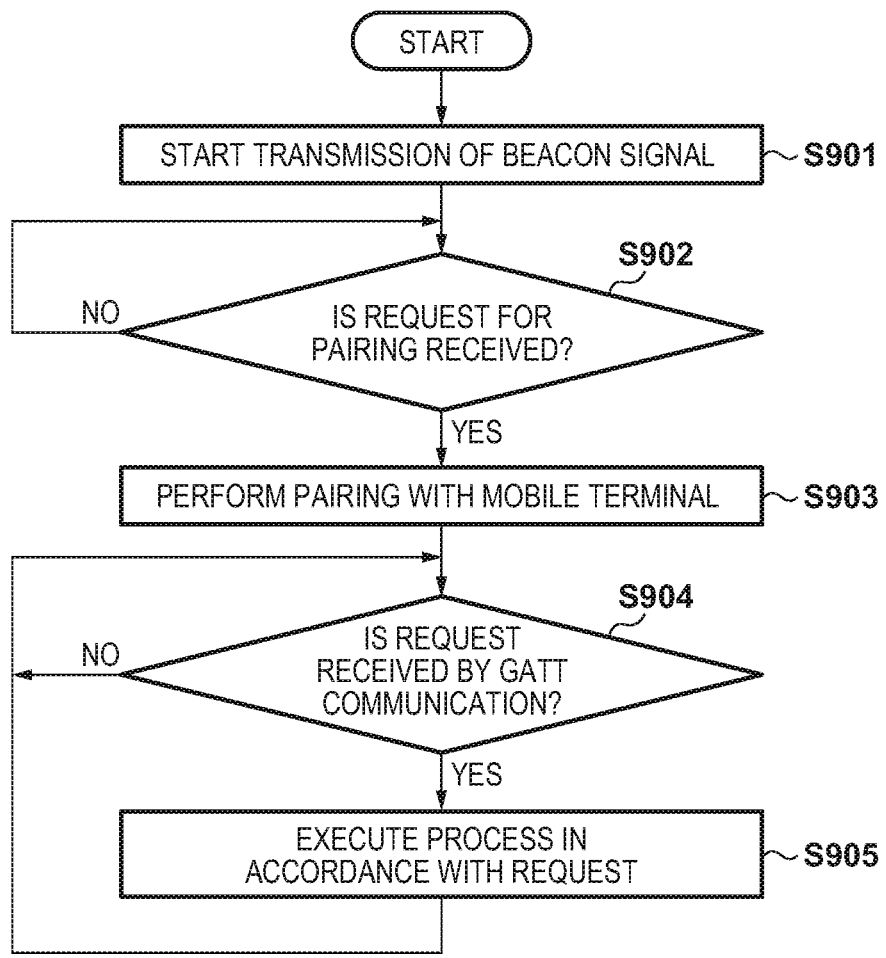

COMMUNICATION APPARATUS, METHOD OF CONTROLLING THE SAME, AND STORAGE MEDIUM

BACKGROUND OF THE INVENTION

Field of the Invention

The present invention relates to a communication apparatus such as a mobile terminal, a method of controlling the same, and a storage medium.

Description of the Related Art

In recent years, information processing apparatuses such as printers having a wireless communication function are increasing. Such printers, by performing an infrastructure connection for wirelessly connecting to a wireless access point (AP) on a network, can be used as a resource on the network. In addition to a function for performing an infrastructure connection, information processing apparatuses such as printers equipped with a function for performing a direct connection in which they themselves directly wirelessly connect with a communication apparatus such as a mobile terminal by operating as a wireless AP are also appearing. A method for searching for a device (such as a printer) on a network and then using it is a known technique for using such a printer via a network (Japanese Patent Laid-Open No. 2000-339259).

In a case where a device (printer) having the above described wireless communication function is used from a communication apparatus such as a mobile terminal or the like, it is necessary to perform a connection to a printer (printer search) in conformity with which of an infrastructure connection and a direct connection to a connection destination printer is set to be possible. For example, if a connection by an infrastructure connection to a printer which is set to a state in which a direct connection is possible is attempted, the connection to the printer will not be successful. Also, it is necessary for a user to operate an operation panel of the printer or the like in order to confirm such a connection setting of the connection destination printer. This leads to the time until the communication apparatus establishes a connection with the printer becoming long as well as a reduction of convenience for the user.

SUMMARY OF THE INVENTION

The present invention was conceived in view of the above described issues. The present invention provides a technique for a communication apparatus to automatically connect to a device that has a function for wireless communication by an infrastructure connection and by a direct connection, in conformity with a connection setting of the device.

According to one aspect of the present invention, there is provided a communication apparatus that performs an infrastructure connection for connecting to an external apparatus through an access point and a direct connection for connecting to an external apparatus without going through an access point, the communication apparatus comprising: a search unit configured to search for surrounding devices; a display unit configured to display a screen of a list of devices discovered by the search unit; and a connection unit configured perform the infrastructure connection to a device selected by a user in the list screen, and in a case where the infrastructure connection to the selected device fails, perform the direct connection to the selected device.

According to another aspect of the present invention, there is provided a method of controlling a communication apparatus that performs an infrastructure connection for connecting to an external apparatus through an access point and a direct connection for connecting to an external apparatus connects without going through an access point, the method comprising: searching for surrounding devices; displaying a screen of a list of devices discovered by the search; and performing the infrastructure connection to a device selected by a user in the list screen, and in a case where the infrastructure connection to the selected device fails, performing the direct connection to the selected device.

According to still another aspect of the present invention, there is provided a computer-readable storage medium storing a computer program for causing a computer to execute a method of controlling a communication apparatus that performs an infrastructure connection for connecting to an external apparatus through an access point and a direct connection for connecting to an external apparatus without going through an access point, the method comprising: searching for surrounding devices; displaying a screen of a list of devices discovered by the search; and performing the infrastructure connection to a device selected by a user in the list screen, and in a case where the infrastructure connection to the selected device fails, performing the direct connection to the selected device.

By virtue of the present invention, a communication apparatus is enabled to automatically connect to a device that has a function for wireless communication by an infrastructure connection and by a direct connection, in conformity with a connection setting of the device.

Further features of the present invention will become apparent from the following description of exemplary embodiments (with reference to the attached drawings).

BRIEF DESCRIPTION OF THE DRAWINGS

FIG. 9 is a flowchart that illustrates a processing procedure of the MFP.

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

First Embodiment

Figure 1A:
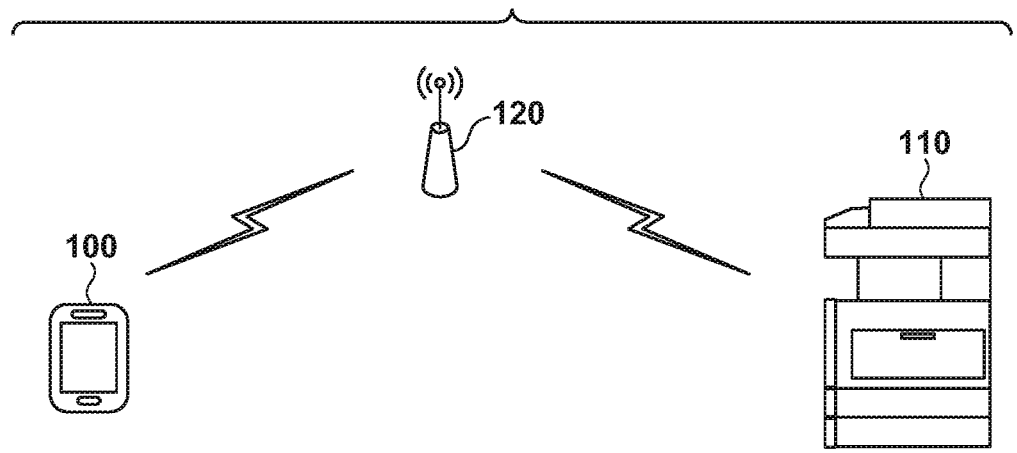
FIG. 1A and FIG. 1B are views illustrating example configurations of communication systems.
Figure 1B:
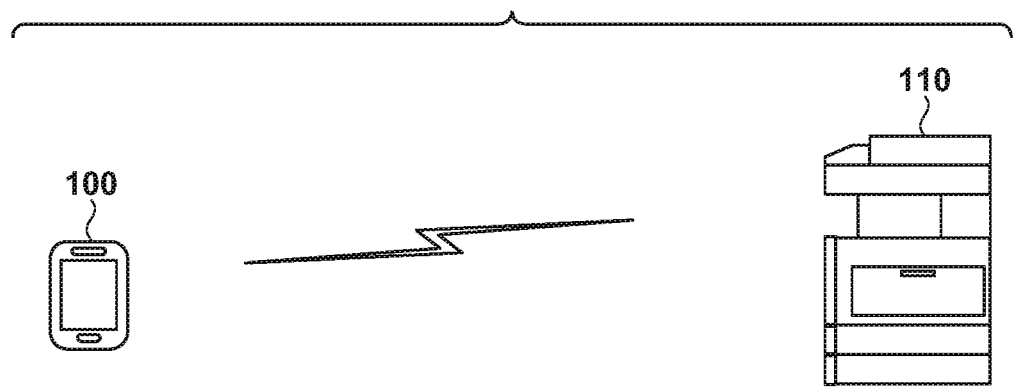

FIG. 1A and FIG. 1B are views illustrating examples of configurations of communication systems according to an embodiment of the present invention. In the communication systems illustrated in FIG. 1A and FIG. 1B, at least one mobile terminal 100 and at least one MFP (multi function peripheral) 110 are included. The mobile terminal 100 is a portable communication apparatus that can perform wireless communication, such as a smart phone, a tablet PC, or the like. The mobile terminal 100 is an example of a communication apparatus that performs an infrastructure connection for connecting to an external apparatus via an access point, and a direct connection for connecting to the external apparatus without going through an access point. An MFP 110 is an information processing apparatus that is equipped with many functions such as a print function, a scan function, a transmission function, or the like, and is an example of an external apparatus that the mobile terminal 100 communicates with. Note that the external apparatus that the mobile terminal 100 communicates with may be any of, for example, a printing apparatus, a printer, a copying machine, an MFP and a facsimile apparatus.

FIG. 1A and FIG. 1B illustrate an infrastructure connection and a direct connection respectively as forms of communication connections of the mobile terminal 100 and the MFP 110. An access point (AP) 120 of the present embodiment is a wireless access point supporting a wireless LAN method. FIG. 1A illustrates an example of an infrastructure connection in which the MFP 110 and the mobile terminal 100 wirelessly connect to the AP 120. In an infrastructure connection, the mobile terminal 100 and the MFP 110 perform communication via the wireless connection destination AP 120. The mobile terminal 100 and the MFP 110 of the present embodiment wirelessly connect to the AP 120 by the wireless LAN (hereinafter referred to as a "WLAN") method in a case where an infrastructure connection is performed.

FIG. 1B illustrates an example of a direct connection in which a direct wireless connection is made without the mobile terminal 100 and the MFP 110 going through the AP 120. In a direct connection, the mobile terminal 100 and the MFP 110 perform a direct wireless connection and wireless communication (direct wireless communication) is performed by the mobile terminal 100 or the MFP 110 operating as an AP by software. In the present embodiment, the MFP 110 operates as the AP and the mobile terminal 100 performs a direct connection for wirelessly connecting directly to the MFP 110 without going through the AP 120 by the mobile terminal 100 becoming a client. Also, the mobile terminal 100 and the MFP 110 of the present embodiment perform a direct connection by a software access point mode (hereinafter referred to as the software AP mode) which is one WLAN method. The software AP mode is one example of a direct wireless communication function for performing a direct connection. Wi-Fi Direct™ may be used in place of the software AP mode as the direct wireless communication function.

The mobile terminal 100 and the MFP 110 of the present embodiment handle not only a WLAN standard, but also a Bluetooth™ (hereinafter referred to as "BT") standard and a BLE (Bluetooth Low Energy) standard which is an extension specification of the BT standard. Accordingly, the mobile terminal 100 and the MFP 110 are capable of performing wireless communication (BT communication) in accordance with the BT standard and wireless communication (BLE communication) in accordance with the BLE standard. BT communication and BLE communication are examples of proximity wireless communication (short-range wireless communication).

In the present embodiment, the mobile terminal 100 is capable of obtaining an IP address for a direct connection and an IP address of the MFP 110 for an infrastructure connection by BT communication (hereinafter also including BLE communication). The IP address for an infrastructure connection is an IP address of the MFP 110 used when the MFP 110 connects to the network via the AP 120 as illustrated in FIG. 1A. The IP address for a direct connection is an IP address of the MFP 110 used in a network (WLAN) formed by the MFP 110 operating as an AP as illustrated in FIG. 1B.

The MFP 110 is capable of, by a setting of a user, switching operation modes (connection setting) between the infrastructure mode for performing an infrastructure connection and the software access point mode (software AP mode) for performing a direct connection. In the software AP mode, a started state is a state in which a direct connection is possible and a suspended state is a state in which a direct connection is impossible. Switching between the started state and the suspended state is also possible by an instruction by BT communication from an external apparatus such as the mobile terminal 100.

In the present embodiment, the mobile terminal 100 searches for the MFP 110 first by an infrastructure connection when connecting to the MFP 110, and then searches for the MFP 110 in a direct connection when the search by the infrastructure connection failed. In this way, the mobile terminal 100 attempts to connect to the MFP 110 by using an infrastructure connection preferentially over a direct connection. This is because it is possible to access the Internet via the AP 120 and communicate with another device while communicating with the MFP 110 in an infrastructure connection, unlike in a direct connection.

Note, the mobile terminal 100 can start a direct connection to the MFP 110 by instructing to start the software AP mode of the MFP 110 by a BT communication in a case where a connection by infrastructure connection failed. In such a case, the mobile terminal 100 obtains a passkey and an SSID for the direct connection from the MFP 110 by a BT communication and performs a wireless connection to a WLAN for direct connection that is formed by the MFP 110. Note, the SSID is one example of identification information of the wireless AP for when the MFP 110 operates as a wireless AP.

<Configuration of the Mobile Terminal>

Figure 2:
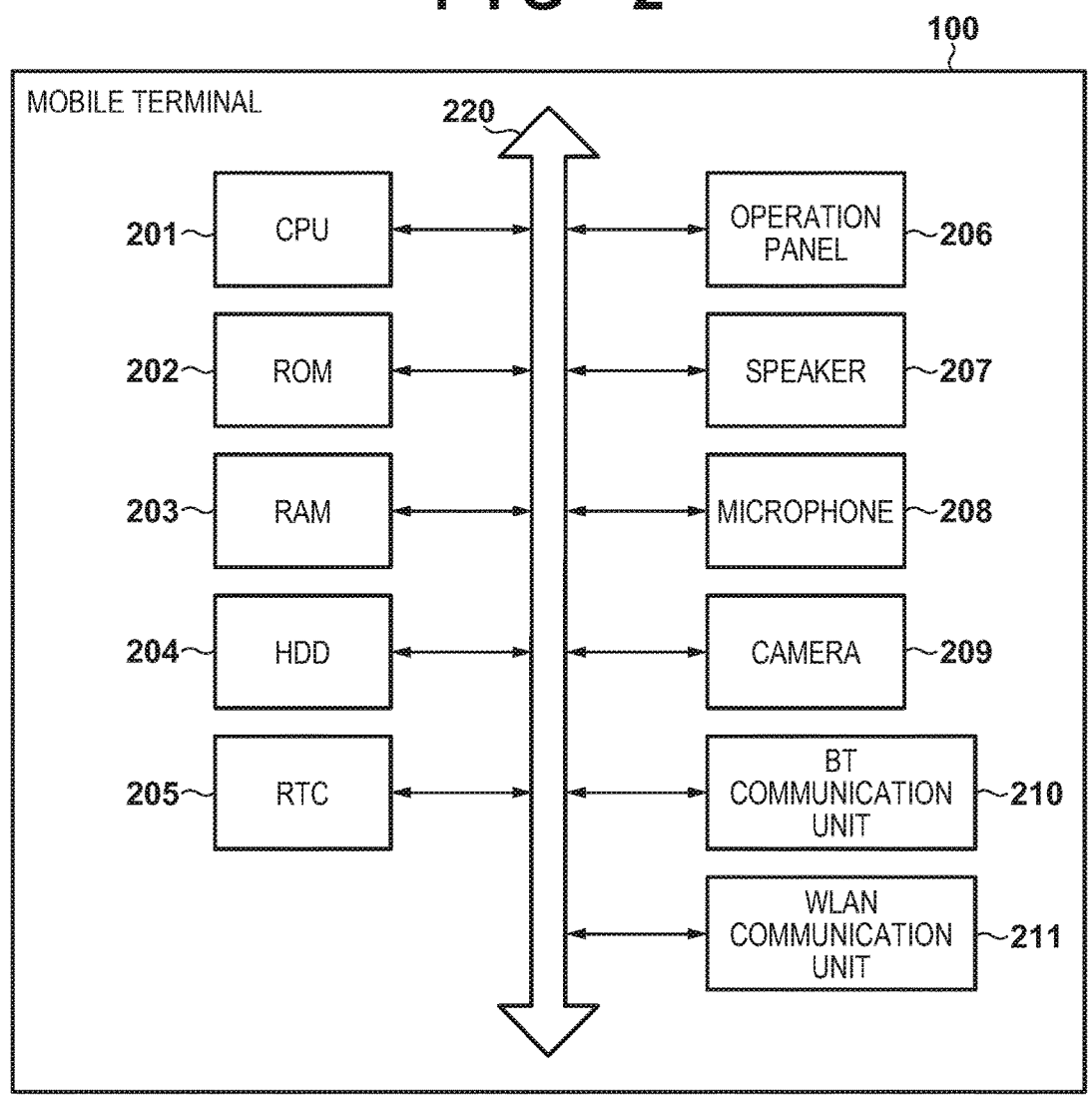
FIG. 2 is a view illustrating an example of a hardware configuration of a mobile terminal.

FIG. 2 is a block diagram illustrating a hardware configuration of the mobile terminal 100. The mobile terminal 100 is equipped with a CPU 201, a ROM 202, a RAM 203, an HDD 204, an RTC 205, an operation panel 206, a speaker 207, a microphone 208, a camera 209, a BT communication unit 210, and a WLAN communication unit 211. These devices within the mobile terminal 100 are connected to a system bus 220.

The CPU 201 controls operation of the mobile terminal 100 by controlling each device connected to the system bus 220 by reading out and executing a control program stored in the ROM 202. The RAM 203 is a storage device functioning as a main memory of the CPU 201. The RAM 203 is used as a work area for the CPU 201 to execute various programs or as a temporary storage area in which various data is temporarily stored.

Various data such as electronic documents and image data in which an object acquired by capturing by the camera 209 are stored in the HDD 204. Programs of various applications such as an MFP application and an OS (operating system) described later are further stored in the HDD 204. An RTC (Real Time Clock) 206 measures the time.

The operation panel 206 has a touch panel function by which a touch operation of a user can be detected and displays various screens provided by various applications operating on the mobile terminal 100 such as the MFP application or the OS. The user can input operation instructions to the mobile terminal 100 by performing a touch operation to the operation panel 206. Configuration may be taken such that the mobile terminal 100 is equipped with hardware keys and the user can input operation instructions by using the hardware keys. The speaker 207 and the microphone 208 can be used by the user when making a call with another mobile terminal or a fixed telephone. The camera 209 captures an object according to a capturing instruction of the user and generates image data. The image data generated by the camera 209 is stored to a predetermined storage area of the HDD 204.

The BT communication unit 210 is a wireless communication module (BT I/F) for performing wireless communication (BT communication) according to the BT standard. The BT communication unit 210 performs a BT communication (including BLE communication) with an external apparatus such as another mobile terminal or the MFP 110 which is equipped with a BT I/F. The WLAN communication unit 211 is a wireless communication module (WLAN I/F) for performing wireless communication (WLAN communication) according to the WLAN standard. The WLAN communication unit 211 performs WLAN communication with an external apparatus equipped with a WLAN I/F. In this way, in the present embodiment, the BT communication unit 210 performs wireless communication of a Bluetooth or BLE method and the WLAN communication unit 211 performs wireless communication of a WLAN method. Note, the wireless communication function by BLE is one example of a wireless communication function of a first type and the wireless communication function of the WLAN method is one example of a wireless communication function of a second type.

Figure 3:
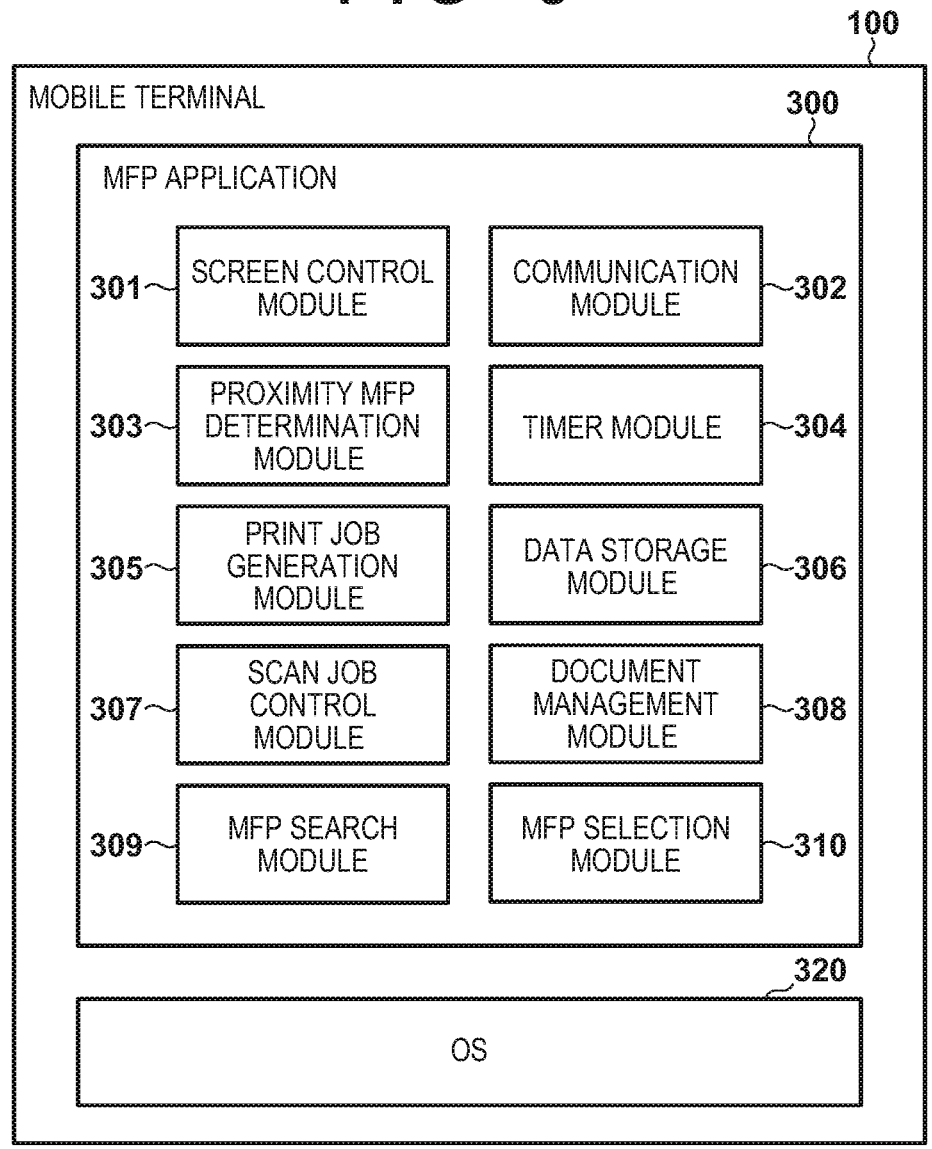
FIG. 3 is a view illustrating an example of a software configuration of the mobile terminal.

FIG. 3 is a block diagram illustrating a software configuration of the mobile terminal 100. Functions of each block illustrated in FIG. 3 are realized on the mobile terminal 100 by the CPU 201 reading out and executing programs (a control program and an application program) stored in the ROM 202 or the HDD 204.

An OS (operating system) 320 is base software for controlling operations of the whole mobile terminal 100. The mobile terminal 100 can be installed with various applications including an MFP application 300 which described later. The OS 320 exchanges information with these applications operating on the mobile terminal 100 and performs processing according to instructions received from each application. For example, the OS 320, in accordance with instructions received from an application, changes the screen displayed on the operation panel 206 and executes wireless communication by the WLAN communication unit 211.

The MFP application (hereinafter, referred to as an "MFP app") 300 is one of the applications installed in the mobile terminal 100 and is an application for performing operation of the MFP 110 from the mobile terminal 100. A user can cause the MFP 110 to execute an operation such as a print or a scan by using the MFP app 300. Note, although a detailed description is omitted, various applications other than the MFP app 300 are installed to the mobile terminal 100. The MFP app 300 includes a screen control module 301, a communication module 302, a proximity MFP determination module 303, a timer module 304, a print job generation module 305, a data storage module 306, a scan job control module 307, a document management module 308, an MFP search module 309, and an MFP selection module 310.

The screen control module 301 causes the operation panel 206 to display an operation screen that the MFP app 300 provides by controlling the screen displayed on the operation panel 206 via the OS 320. Also, the screen control module 301 accepts an instruction that the user inputted via the operation panel 206 and determines the contents of the instruction. The communication module 302 controls, via the OS 320, BT communication (proximity wireless communication) by the BT communication unit 210 and wireless communication by the WLAN communication unit 211. The communication module 302 instructs switching of an SSID to the OS 320 and transmits/receives commands for example. The timer module 304 uses the RTC 205 to measure time.

The print job generation module 305 generates a print job and causes the MFP 110 to execute the print job by transmitting the generated print job to the MFP 110 via the WLAN communication unit 211. The data storage module 306 corresponds to a storage area of the RAM 203 or the HDD 204 and various data is temporarily stored therein. The scan job control module 307 performs a scan instruction to the MFP 110 via the WLAN communication unit 211 and receives via the WLAN communication unit 211 scan data generated by the MFP 110. The scan job control module 307 may display the received scan data on the operation panel 206 and may store it in the data storage module 306 for saving. The document management module 308 manages document data, such as scan data, which is stored in the data storage module 306.

The proximity MFP determination module 303, based on a radio field intensity (received signal intensity) of a beacon signal received by the BT communication unit 210, determines whether or not the MFP (device) of the beacon signal transmission source is closely positioned (proximal to) to the mobile terminal 100. The proximity MFP determination module 303 discovers proximal MFPs by determining MFPs proximal to the mobile terminal 100 (MFPs existing within a range in which it is possible to communicate with the mobile terminal 100 by the BT method) and generates a list of proximal MFPs.

The MFP selection module 310, according to a user selection via the operation panel 206, selects a connection destination (operation target) MFP from the list of MFPs generated by the proximity MFP determination module 303 and stores data indicating the selected MFP in the data storage module 306. Note, a list of MFPs selected in the past is stored in the data storage module 306.

The MFP search module 309 obtains via the BT communication unit 210 connection information (such as an IP address and an SSID) necessary to connect to the MFP selected by the MFP selection module 310. Furthermore, the MFP search module 309, by transmitting a connection command to the selected MFP via the WLAN communication unit 211, performs a connection for communication to the MFP.

<Configuration of the MFP>

Figure 4:
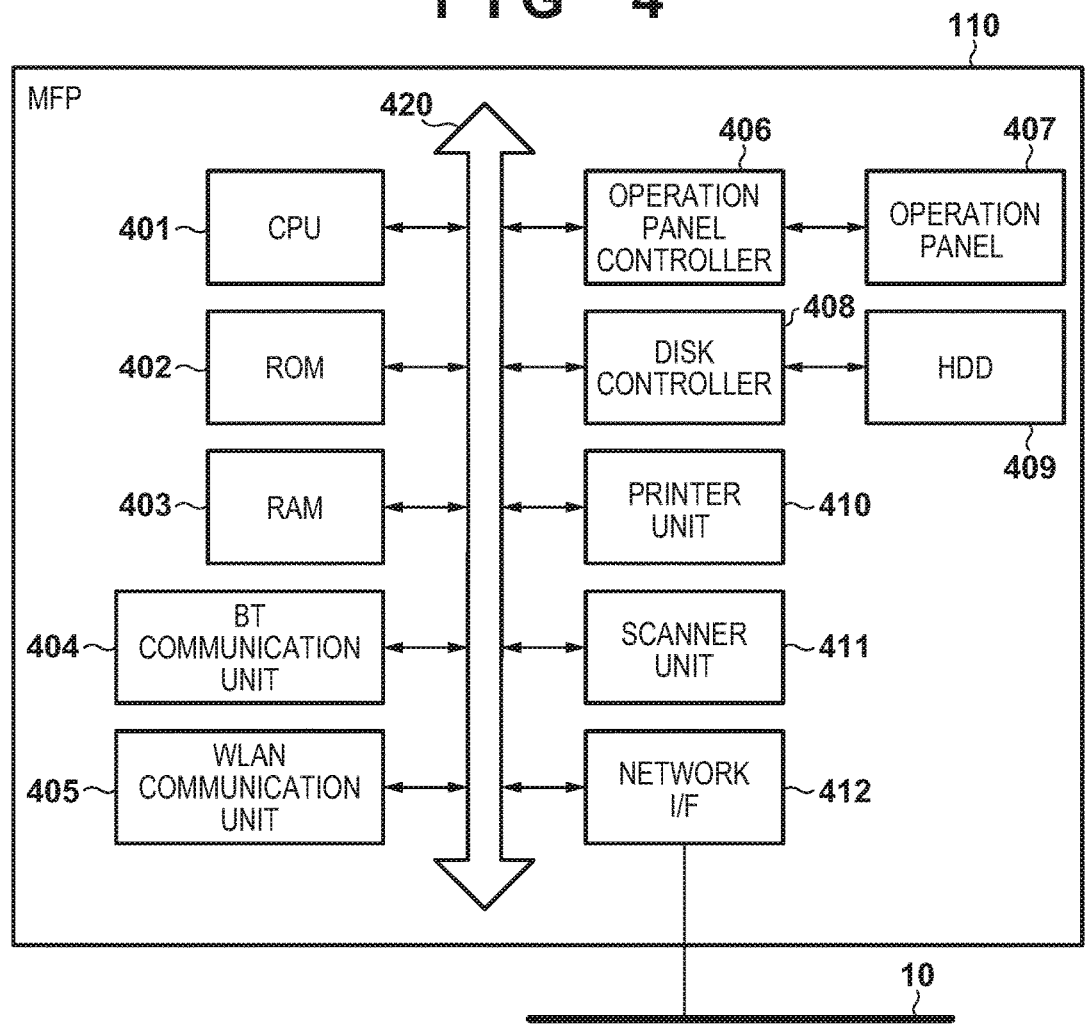
FIG. 4 is a view illustrating an example of a hardware configuration of an MFP.

FIG. 4 is a block diagram illustrating an example of a hardware configuration of the MFP 110. The MFP 110 is equipped with a CPU 401, a ROM 402, a RAM 403, a BT communication unit 404, a WLAN communication unit 405, an operation panel controller 406, a disk controller 408, a printer unit 410, a scanner unit 411, and a network I/F 412. These devices within the MFP 110 are connected to a system bus 420. The MFP 110 is further equipped with an operation panel 407 connected to the operation panel controller 406 and an HDD 409 connected to the disk controller 408.

The CPU 401 controls operation of the MFP 110 by controlling each device connected to the system bus 420 by reading out and executing a control program stored in the ROM 402 or the HDD 409. The RAM 403 is a storage device functioning as a main memory of the CPU 401. The RAM 403 is used as a work area for the CPU 401 to execute various programs or as a temporary storage area in which various data is temporarily stored. There are cases where the HDD 409 is used as a temporary storage area for image data.

The operation panel controller 406 and the disk controller 408, under the control of the CPU 401, control the operation panel 407 and the HDD 409 respectively. Various buttons, a display, and the like are arranged on the operation panel 407. The display has a touch panel function by which a touch operation of the user can be detected. The printer unit 410 forms (prints) an image onto a sheet by a predetermined method such as an electrophotographic method or an ink-jet method. The scanner unit 411 optically reads an original image and generates image data. The scanner unit 411 may also be equipped with an ADF (automatic document feeder) as an option.

The BT communication unit 404 is a wireless communication module (BT I/F) for performing wireless communication (BT communication) according to the BT standard. The BT communication unit 404 performs a BT communication (including BLE communication) with an external apparatus such as another mobile terminal 100 which is equipped with a BT I/F. The WLAN communication unit 405 is a wireless communication module (WLAN I/F) for performing wireless communication (WLAN communication) according to the WLAN standard. The WLAN communication unit 405 performs WLAN communication with an external apparatus equipped with a WLAN I/F. The network I/F 412 is a communication module (NIC: Network Interface Card) for connecting to a wired network 10 such as a wired LAN. The network I/F 412 performs transmission/reception of data with an external apparatus such as a network device or a file server.

The MFP 110 (WLAN communication unit 405) performs wireless communication. The MFP 110 can operate in an infrastructure mode or a software AP mode in a case where performing a wireless communication (WLAN communication) by using the WLAN communication unit 405. In the case of the infrastructure mode, the MFP 110 establishes a wireless connection with an AP such as the AP 120 and communicates with an external apparatus via the AP. In the case of the software AP mode, the MFP 110 establishes a direct wireless connection (direct connection) and communicates with an external apparatus by the MFP 110 operating as an AP.

Figure 5:
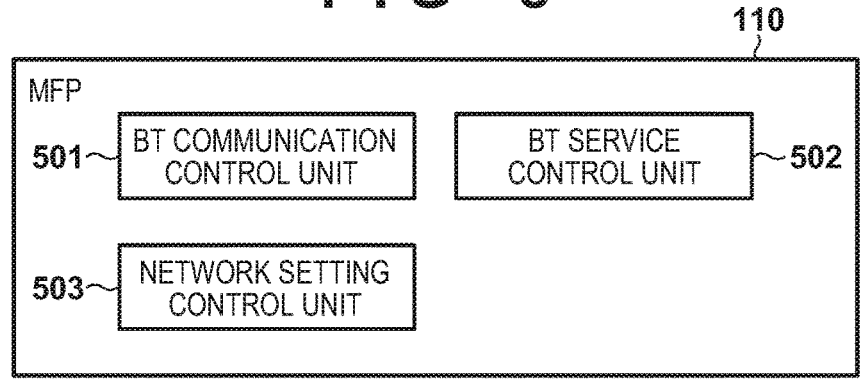
FIG. 5 is a view illustrating an example of a software configuration of the MFP.

FIG. 5 is a block diagram illustrating an example of a software configuration of the MFP 110. Functions of each block illustrated in FIG. 5 are realized on the MFP 110 by the CPU 401 reading out and executing control programs stored in the ROM 402 or the HDD 409.

A BT communication control unit 501 is a device driver for controlling the BT communication unit 404 and controls data communication with an external apparatus such as the mobile terminal 100 which is the communication partner of BT communication. Data received by the BT communication control unit 501 is passed to and processed by a BT service control unit 502.

The BT service control unit 502 provides services to the external apparatus by the BT communication. If the BT communication unit 404 establishes a BT connection with an external apparatus, the BT service control unit 502 exposes to the external apparatus setting information defined by a GATT profile (Generic Attribute Profile). Connection information for connecting to the MFP 110 by the WLAN method, such as an IP address of the MFP 110 for an infrastructure connection, an IP address of the MFP 110 for a direct connection, and a passkey and SSID for a direct connection, are included in the setting information. Also, the BT service control unit 502 can receive from the external apparatus, by BT communication based on a GATT profile, various instructions (requests) such as a start instruction and a stop instruction of the software AP mode.

A network setting control unit 503, according to an instruction from the BT service control unit 502, executes an access point function (software AP mode) for causing the MFP 110 to operate as an AP by software for a direct connection.

<Processing in the Mobile Terminal>

The mobile terminal 100 of the present embodiment searches for surrounding devices and by displaying on the operation panel 206 a screen of a list of devices discovered by the search, accepts a selection by a user of a device. The mobile terminal 100 first performs an infrastructure connection to a selected device that is selected by the user in the list screen displayed on the operation panel 206. In a case where the infrastructure connection to the selected device fails, the mobile terminal 100 further performs a direct connection to the selected device. Note, a wireless communication function by BLE can be used in the search for surrounding devices. Also, a wireless communication function of the WLAN method can be used for an infrastructure connection and a direct connection to the selected device. By such processing, it is possible to automatically connect to the MFP in conformity with the current connection setting (an infrastructure connection setting or a direct connection setting) of the MFP. Specifically, the mobile terminal 100 can connect to the MFP by only operation on the mobile terminal 100 side without it being necessary for the user to operate the operation panel 407 of the MFP to confirm the current connection setting of the MFP.

Figure 6:
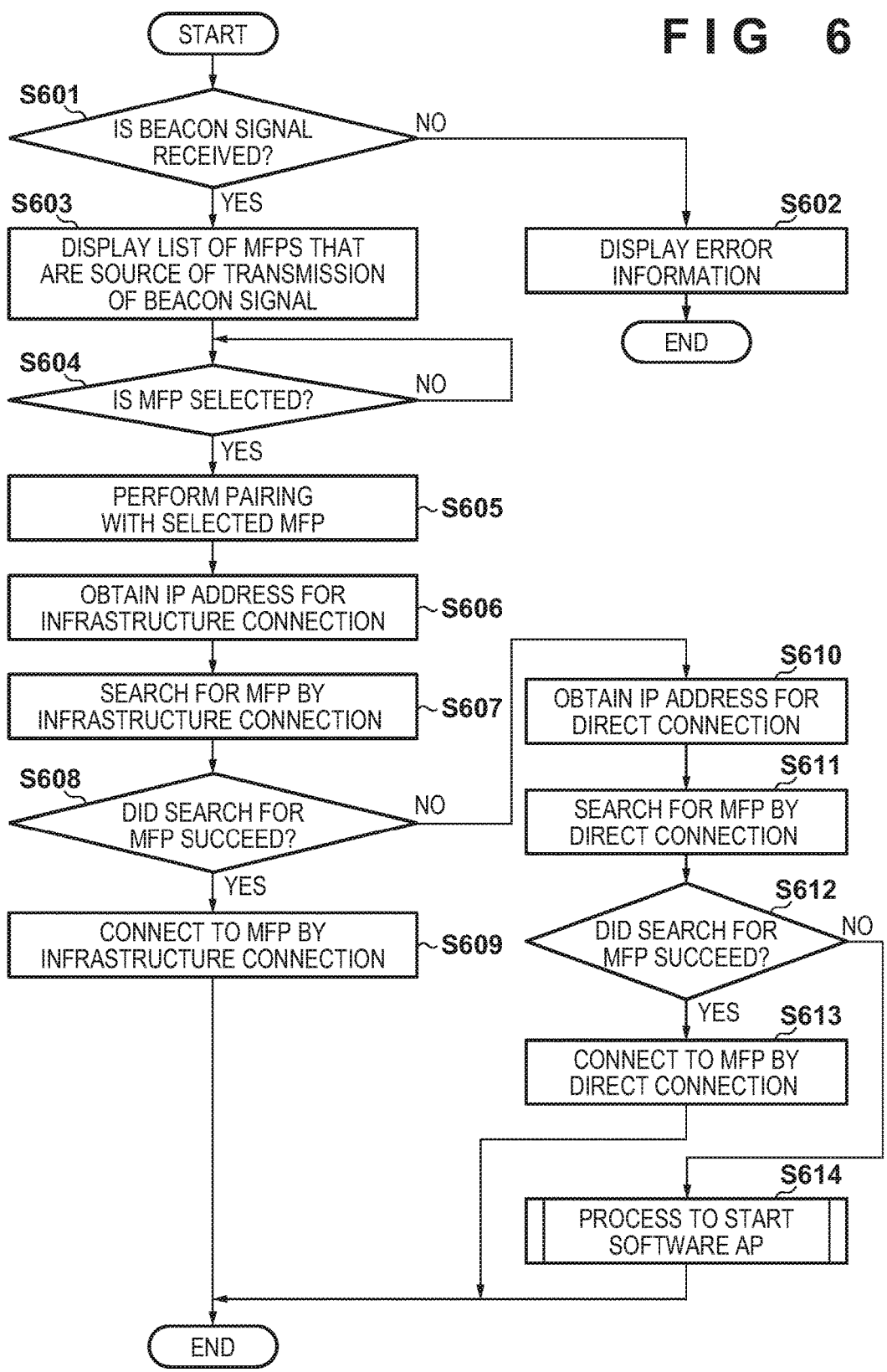
FIG. 6 is a flowchart for describing a processing procedure of the mobile terminal according to the first embodiment.
Figure 7:
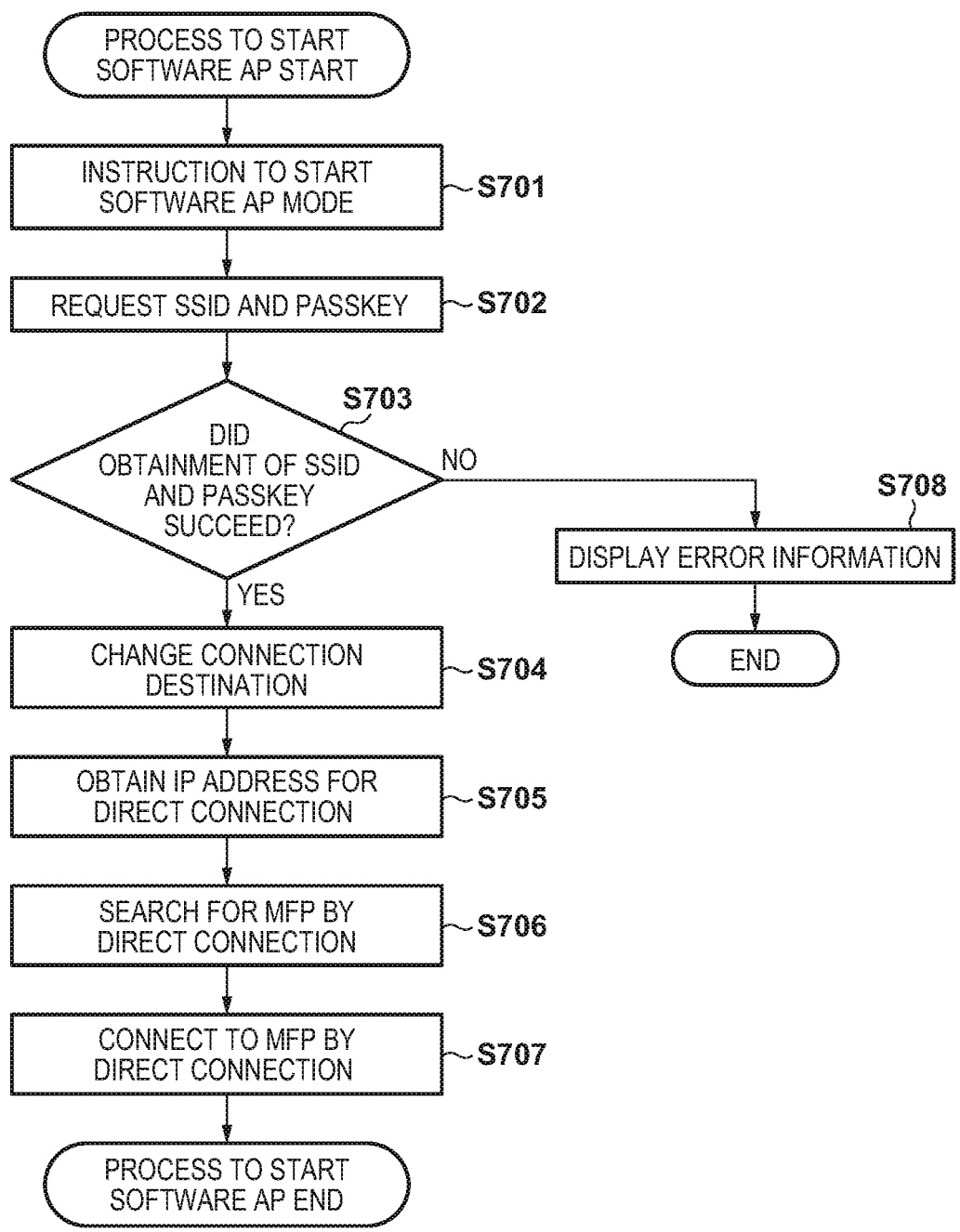
FIG. 7 is a flowchart that illustrates a processing procedure of step S614 of FIG. 6.
Figure 8A:
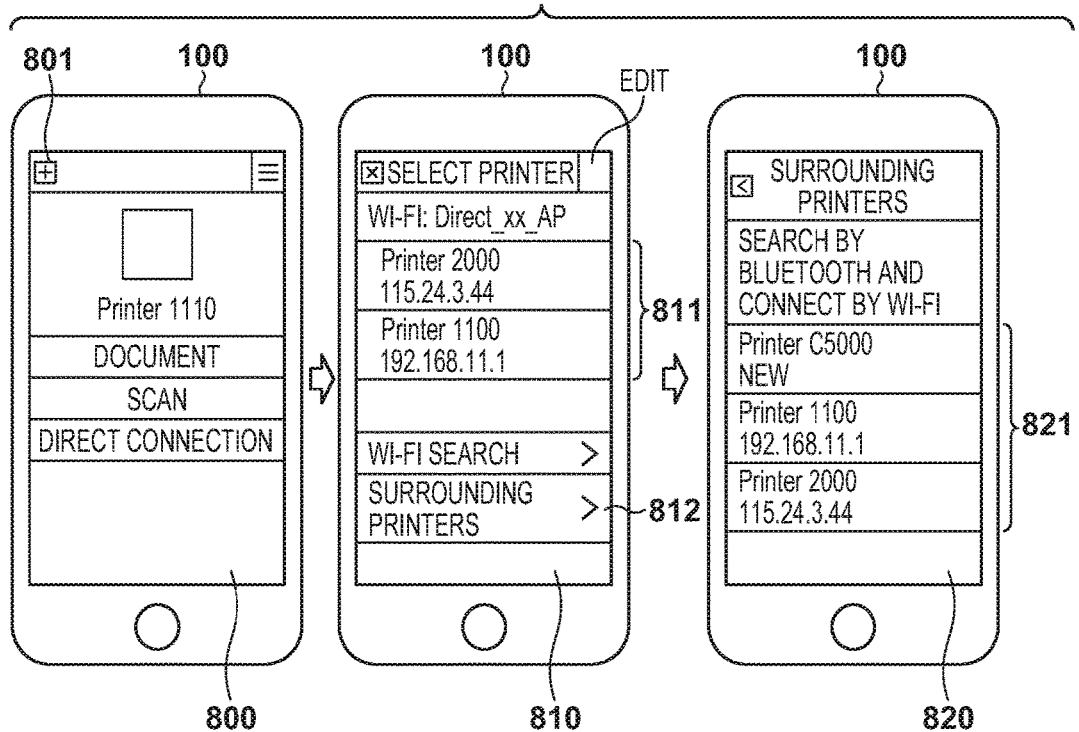
FIG. 8A and FIG. 8B are views illustrating examples of operation screens provided by an MFP app.

Hereinafter, with reference to FIG. 6 through FIG. 8A, description will be given regarding a concrete example for realizing the above processing in the mobile terminal 100 by the MFP app 300 installed on the mobile terminal 100. FIG. 6 and FIG. 7 are flowcharts illustrating a procedure of a process for connecting to the MFP which is executed by the MFP app 300 on the mobile terminal 100. FIG. 8A is a figure illustrating examples of operation screens provided by the MFP app 300. The processing of each step illustrated in FIG. 6 and FIG. 7 is realized by the CPU 201 reading out and executing programs stored in the ROM 202 or the HDD 204. Note, although an example in which a single CPU 201 executes each step of the processing is illustrated in the present embodiment, the mobile terminal 100 may be configured such that a plurality of CPUs cooperate to execute each step of the processing for example.

FIG. 8A illustrates one example of transitions of operation screens of the MFP app 300 in a case where the MFP app 300 performs a device search for an MFP selected by the user. A display screen of the operation panel 206 transitions to a device list screen 810 when the user selects (selection operation) a device list button 801 on a home screen 800 of the MFP app 300. In the device list screen 810, a list 811 of devices ("printers" which correspond to MFPs), which are stored as history information within the mobile terminal 100 and which the mobile terminal 100 has connected to in the past, are displayed.

The MFP app 300 searches by BT communication for a device (MFP) present in the surroundings of the mobile terminal 100 when the user selects a search menu button 812 in the device list screen 810. Specifically, the MFP app 300, by receiving a beacon signal (a BLE advertisement packet for example) transmitted from an MFP present nearby, discovers the MFP that transmitted the beacon signal. The MFP app 300 displays on the operation panel 206 a BT search screen 820 for selecting a connection destination MFP from one or more MFPs discovered in such a way. The BT search screen 820 is a screen of a list of MFPs discovered by a search, and a list 821 of one or more MFPs that are discovered is displayed in the BT search screen 820. When an MFP is selected by the user from the list 821 within the BT search screen 820, the MFP app 300 performs connection processing by the procedure illustrated in FIG. 6 to the selected MFP.

In the present embodiment, the MFP app 300 (CPU 201) starts execution of the processing of FIG. 6 when the display screen of the operation panel 206 transitions to the BT search screen 820 by a selection operation of the search menu button 812 being performed in the device list screen 810. Firstly, in step S601, the CPU 201 starts processing for receiving a beacon signal transmitted from an external MFP, and searches for a surrounding MFP (device) by determining whether or not the beacon signal is received from the MFP. The CPU 201 advances the processing to step S602 in a case where the beacon signal is not received. In step S602, the CPU 201 displays on the operation panel 206 error information indicating that an MFP present nearby could not be discovered and ends the processing. Meanwhile, the CPU 201 advances the processing to step S603 in a case where a beacon signal is received from one or more MFPs in step S601.

In step S603, the CPU 201 displays on the operation panel 206 a list of MFPs that are the source of the transmission of the beacon signal received in step S601 (that is, a list of discovered MFPs). Here, the CPU 201 accepts a selection of a connection destination MFP from the list 821 of discovered MFPs by displaying on the operation panel 206 the BT search screen 820 illustrated in FIG. 8A as a screen of a list of MFPs (devices) discovered by the search of step S601. In step S604, the CPU 201 determines whether or not an MFP is selected by the user in the BT search screen 820 and advances the processing to step S605 when the MFP is selected. Note that in the present embodiment, it is assumed that the MFP 110 is selected. Specifically, the MFP 110 corresponds to a selected device selected by a user in the list screen. In step S605, the CPU 201 performs a pairing for BT communication with the MFP 110 which is the MFP selected in step S604. By this, a BT connection between the mobile terminal 100 and the MFP 110 is established and the state becomes such that BT communication is possible.

After this, the CPU 201 attempts to connect to the MFP 110 first by an infrastructure connection in step S606 through in step S609. In step S606, the CPU 201 obtains from the MFP 110 by BT communication an IP address of the MFP 110 for infrastructure connection as connection information necessary to connect to the MFP 110 by an infrastructure connection. Specifically, the CPU 201 makes a request for an IP address of the MFP 110 for infrastructure connection by a BT communication based on a GATT profile (hereinafter referred to as a "GATT communication"). Note, the GATT communication is performed by the BT communication unit 210. When the IP address is obtained in step S606, the CPU 201 uses the obtained IP address and attempts to connect to the MFP 110 by an infrastructure connection by performing a search for the MFP 110 by an infrastructure connection in step S607. Specifically, the CPU 201 performs a search for the MFP 110 over the WLAN formed by the AP 120 as illustrated in FIG. 1A rather than by BT communication. This search is executed by transmitting via the AP 120 a connection request packet in which the IP address of the MFP 110 for infrastructure connection is set as the destination, for example.

After this, the CPU 201 determines whether or not the search for the MFP 110 by the infrastructure connection succeeded in step S608. For example, the CPU 201 determines whether or not a response packet is received from the MFP 110 within a predetermined time (for example, 10 seconds) from when the connection request packet, in which the IP address of the MFP 110 for infrastructure connection is set as the destination, was transmitted. In a case where a response packet is received within a predetermined time, the CPU 201 determines that the search for the MFP 110 succeeded and advances the processing to step S609. In step S609, the CPU 201 connects to the MFP 110 (establishes a communication link with the MFP 110) by an infrastructure connection by transmitting an acknowledgement (ACK) packet for the foregoing response packet for example, and ends the processing. Meanwhile, the CPU 201 determines whether or not the search for the MFP 110 failed (connection to the MFP 110 failed) in a case where a response packet is not received within a predetermined time and advances the processing to step S610.

In a case where the connection to the MFP 110 by the infrastructure connection failed as described above, the CPU 201 next attempts to connect to the MFP 110 by a direct connection in step S610 through step S613. In step S610, the CPU 201 obtains from the MFP 110 by BT communication an IP address of the MFP 110 for direct connection as connection information necessary to connect to the MFP 110 by a direct connection. Specifically, the CPU 201 makes a request for the IP address of the MFP 110 for direct connection by the GATT communication similar to step S606.

When the IP address is obtained in step S610, the CPU 201 in step S611 uses the obtained IP address and attempts to connect to the MFP 110 by a direct connection by performing a search for the MFP 110 by a direct connection. Specifically, the CPU 201 performs a search for the MFP 110 over the WLAN, which is formed by the MFP 110 operating as an AP as illustrated in FIG. 1B, rather than by BT communication. This search is executed by transmitting, via a wireless AP indicated by an SSID for direct connection, a connection request packet in which the IP address of the MFP 110 for direct connection is set as the destination, for example.

Note, configuration may be taken so that a passkey and SSID for a direct connection necessary for access to the WLAN formed by the MFP 110 is obtained from the MFP 110 by BT communication in step S610. Alternatively, configuration may be taken so that in a case where the passkey and SSID for a direct connection are stored as history information in the HDD 204 or the like, the passkey and SSID are obtained from the history information. Also, note that configuration may be taken so that an IP address for direct connection is obtained from the MFP 110 together with the IP address for infrastructure connection in step S606 rather than in step S610.

After this, the CPU 201 determines whether or not the search for the MFP 110 by the direct connection succeeded in step S612. In step S612, similarly to step S608, the CPU 201 can determine whether or not a response packet was received from the MFP 110 within a predetermined time (for example, 10 seconds) from when the connection request packet, in which the IP address of the MFP 110 for direct connection is set as the destination, is transmitted. In step S612, when the CPU 201 determines that the search for the MFP 110 by the direct connection succeeded, it advances the processing to step S613. In step S613, the CPU 201 connects to the MFP 110 (establishes a communication link with the MFP 110) by a direct connection by transmitting an acknowledgement (ACK) packet for the foregoing response packet for example, and ends the processing. Meanwhile, in a case where the CPU 201 determines that the search for the MFP 110 failed (connection to the MFP 110 failed), it advances the processing to step S614.

In step S614, the CPU 201 causes an operation in the software AP mode to be started (activates a software AP) and executes processing for connecting by a direct connection to the MFP 110. Specifically, the CPU 201, for the MFP 110 selected as the connection destination MFP, makes an instruction to the MFP 110 by a BT communication for a start of the software AP mode in which the MFP 110 operates as an AP, and attempts to connect to the MFP 110 by a direct connection. The process of step S614 is performed by the procedure illustrated in FIG. 7.

Firstly, the CPU 201, in step S701, makes a request to the MFP 110 for a start of a direct connection by transmitting to the MFP 110 an instruction to start the software AP mode by the GATT communication. Next, the CPU 201 makes a request to the MFP 110 for a passkey and SSID for direct connection by the GATT communication in step S702 and determines whether or not obtainment of these succeeded in step S703. The CPU 201 advances the processing to step S704 in a case where the obtainment of the SSID and passkey succeeded and advances the processing to step S708 in a case where the obtainment failed. In step S708, the CPU 201 displays on the operation panel 206 error information indicating the failure to connect to the MFP 110 and ends the processing.

Meanwhile, the CPU 201, in step S704, uses the obtained SSID and passkey to perform processing for switching the AP, which is the wireless connection connection destination. After this, the CPU 201 performs the same processing as in step S610, step S611, and step S613 in step S705 through step S707. Specifically, the CPU 201 obtains from the MFP 110 an IP address of the MFP 110 for direct connection by BT communication once again in step S705. In step S706, the CPU 201 uses the obtained IP address to perform a search for the MFP 110 by a direct connection. Furthermore, when a response packet is received from the MFP 110, the CPU 201, in step S707, connects to the MFP 110 (establishes a communication link with the MFP 110) by a direct connection and ends the processing.

<Processing in the MFP>

Next, description is given regarding a procedure of processing executed by the MFP 110 with reference to FIG. 9. The processing of each step illustrated in the flowchart of FIG. 9 is realized by the CPU 401 reading out and executing a program stored in the ROM 402 or the HDD 409.

When the MFP 110 activates, the CPU 401 starts transmission of a beacon signal by the BT communication unit 404 in step S901. In the present embodiment, the beacon signal is periodically transmitted by a predetermined transmission power. Next in step S902, the CPU 401 determines whether or not a pairing request for BT communication is received from a mobile terminal and when the pairing request is received, advances the processing to step S903. Note that in the present embodiment, it is assumed that the pairing request is received from the mobile terminal 100. In step S903, the CPU 401 performs a pairing with the mobile terminal 100, which is the transmission source of the pairing request.

When the pairing completes, the CPU 401 determines whether or not any request from the mobile terminal 100 is received by GATT communication via a BT connection established between the mobile terminal 100 and the MFP 110 in step S904. The CPU 401 advances the processing to step S905 when it receives the request from the mobile terminal 100, and after executing processing according to the received request, returns the processing to step S904. In this way, the CPU 401, for each reception of a request from the mobile terminal 100 while the BT connection is established with the mobile terminal 100, executes processing corresponding to the request.

A request received in step S904, is a request for an IP address for infrastructure connection (step S606), a request for an IP address for direct connection (step S610 and step S705), and a start instruction (step S701) or a stop instruction of the software AP mode for example. In a case where the CPU 401 receives a request for an IP address for infrastructure connection, it transmits to the mobile terminal 100 the IP address of the MFP 110 for infrastructure connection. In a case where the CPU 401 receives a request for an IP address for direct connection, it transmits to the mobile terminal 100 the IP address of the MFP 110 for direct connection. Also, in a case where the CPU 401 receives a start instruction or a stop instruction for the software AP mode, it performs software AP mode start processing or stop processing and transmits a processing result to the mobile terminal 100.

As described above, by virtue of the present embodiment, it is possible for the mobile terminal 100 to automatically connect to the MFP in conformity with a connection setting (a setting of an infrastructure connection or a setting of a direct connection) of the MFP 110 which is the connection destination MFP. Specifically, the mobile terminal 100 can connect to the MFP by only operation on the mobile terminal 100 side without it being necessary for the user to operate the operation panel 407 of the MFP 110 to confirm the current connection setting of the MFP. Accordingly, it is possible to cause the convenience of a user to improve when the mobile terminal 100 connects to the MFP and also it is possible to prevent a lengthening of a time required to connect to an MFP.

Second Embodiment

In the first embodiment, the mobile terminal 100 attempts to connect to the MFP 110 by using an infrastructure connection preferentially over a direct connection. Specifically, when a connection by an infrastructure connection fails, the mobile terminal 100 next attempts to connect by a direct connection. A case when a connection by an infrastructure connection fails corresponds to a case when there is no response from the MFP 110 within a predetermined time from when a search for the MFP 110 by an infrastructure connection is started. Accordingly, a predetermined time from a start of an attempt to connect to the MFP 110 until a start of a direct connection attempt becomes necessary. However, in a case such as a reconnection to an MFP to which a connection by a direct connection was made in the past, there is a possibility that it is possible to connect in a shorter time by using a direct connection preferentially over an infrastructure connection.

Accordingly, in the second embodiment, when connection to a MFP selected by a user is to be performed, selection is made as to whether to first attempt an infrastructure connection or to attempt a direct connection without attempting an infrastructure connection, based on a connection history of the MFP. Also, the mobile terminal 100 attempts a direct connection without attempting an infrastructure connection in a case where the user makes an instruction for a start of a direct connection. Note, description is given of points of difference with the first embodiment as the focus in the present embodiment hereinafter.

Figure 8B:
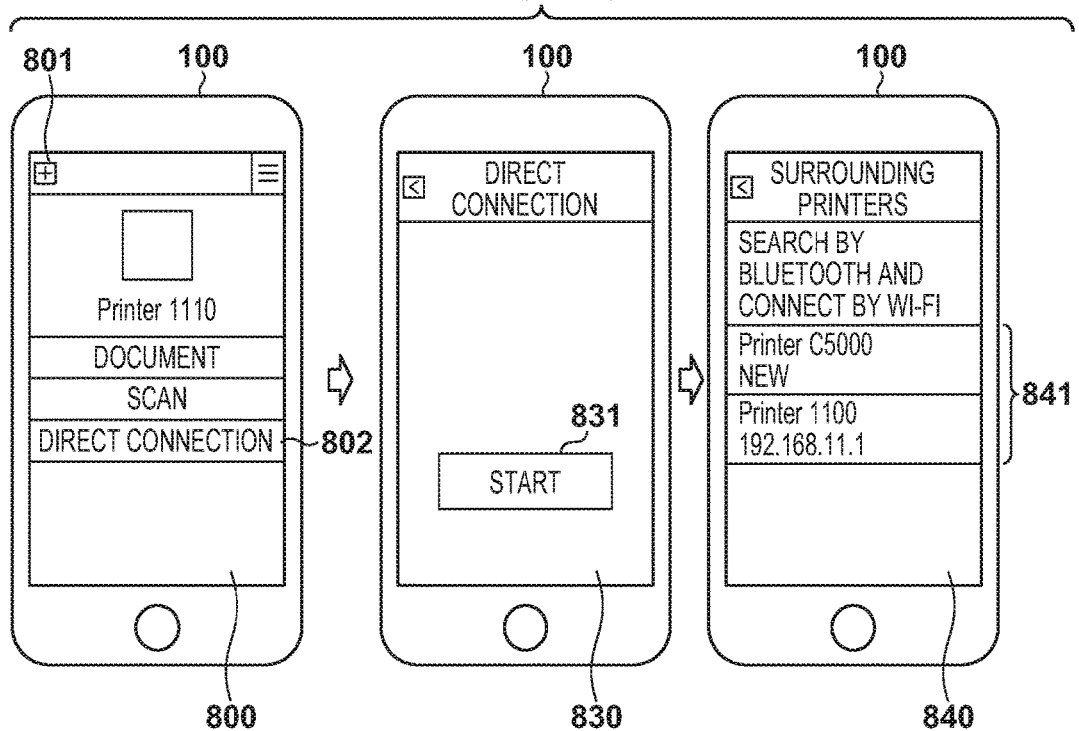

FIG. 8B illustrates one example of a transition of operation screens of the MFP app 300 in a case where the user makes an instruction for a start of a direct connection. A display screen of the operation panel 206 transitions to a direct connection screen 830 when the user selects a menu button 802 of "direct connection" on the home screen 800 of the MFP app 300. In the direct connection screen 830, a start button 831 for making an instruction for a start of a direct connection is displayed. When the user selects the start button 831 in the direct connection screen 830, the MFP app 300 transitions the display screen of the operation panel 206 to a BT search screen 840.

In the BT search screen 840, similarly to the first embodiment, a list 841 of one or more MFPs discovered by the MFP app 300 searching by BT communication (based on a beacon signal) for devices (MFP) present close to the mobile terminal 100 is displayed. Note, external apparatuses (mobile terminals) to which a direct connection is allowed may be set in advance for each MFP. In this case, configuration may be taken to display only MFPs which allow a direct connection from the mobile terminal 100 in the list 841.

Figure 10:
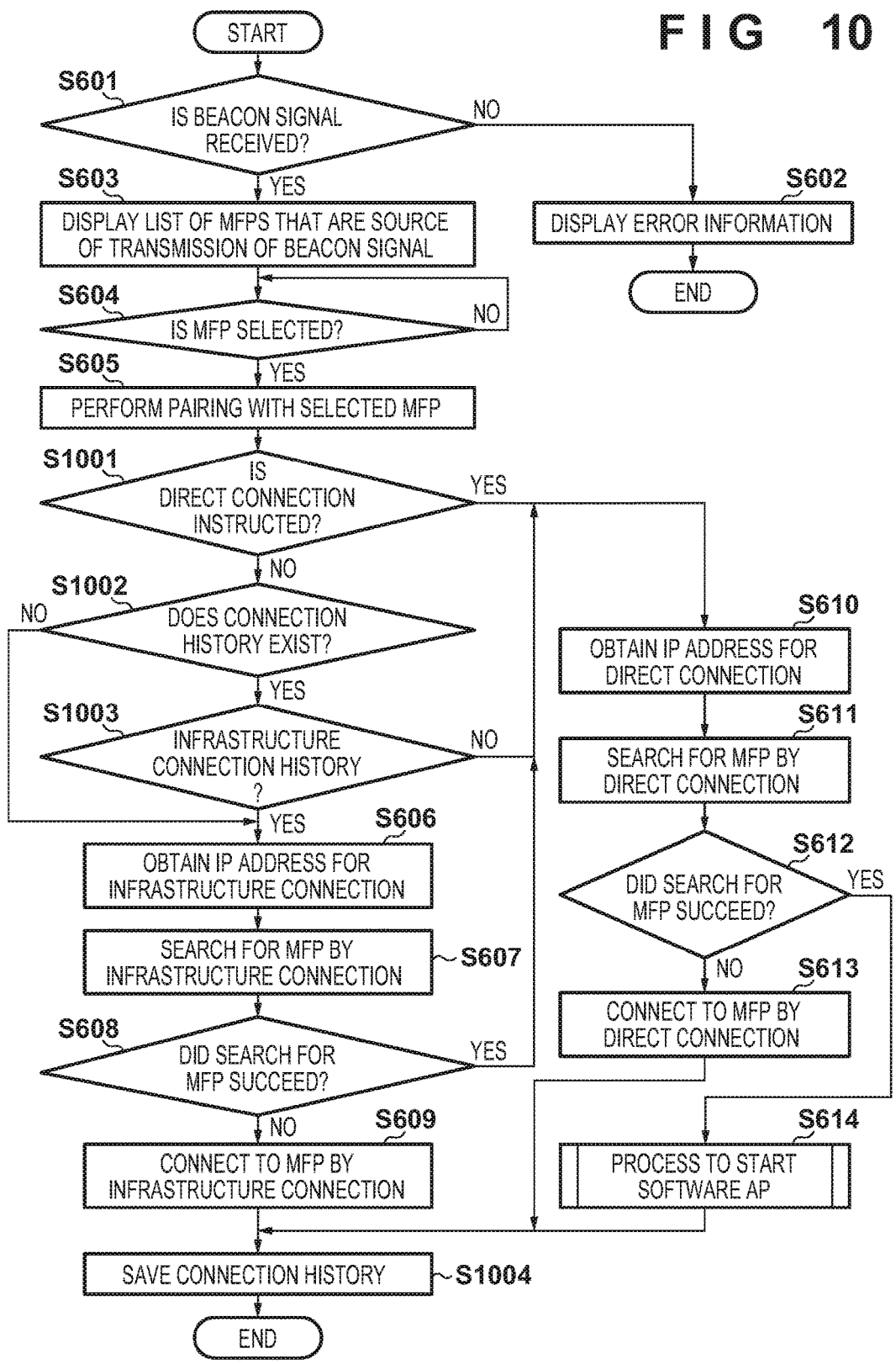
FIG. 10 is a flowchart for describing a processing procedure of the mobile terminal according to a second embodiment.

When an MFP is selected by the user from the list 841 within the BT search screen 840, the MFP app 300 performs processing to connect to the selected MFP by the procedure illustrated in FIG. 10. In such a case, it can be considered that a user makes an explicit instruction of a start of a direct connection and the MFP app 300 attempts a connection to the MFP by a direct connection without attempting an infrastructure connection.

FIG. 10 is flowchart illustrating a procedure of a process for connecting to the MFP which is executed by the MFP app 300 on the mobile terminal 100. The processing of each step illustrated in FIG. 10 is realized by the CPU 201 reading out and executing programs stored in the ROM 202 or the HDD 204. Also, the processing of step S601 through step S614 of FIG. 10 is the same as in the first embodiment and description regarding these processes are omitted hereinafter.

In the present embodiment, the MFP app 300 (CPU 201) starts an execution of the processing of FIG. 10 when the display screen of the operation panel 206 transitions to the BT search screen 840 by a selection operation of the start button 831 being performed in the direct connection screen 830. Note that CPU 201 similarly starts an execution of the processing of FIG. 10 when the display screen of the operation panel 206 transitions to the BT search screen 820 by a selection operation of the search menu button 812 being performed in the device list screen 810.

Step S601 through step S605 are the same as in the first embodiment. Note that in the present embodiment, it is assumed that the MFP 110 is selected in step S604. When a pairing with the MFP 110 completes in step S605, the CPU 201 advances the processing to step S1001.

The CPU 201 determines whether or not a direct connection is instructed by the user in step S1001, and advances the processing to step S610 if it is determined that a direct connection is instructed and advances the processing to step S1002 if it is determined that a direct connection is not instructed. The CPU 201 determines that a direct connection is instructed in step S1001 if a selection operation of the start button 831 is performed in the direct connection screen 830. In a case where an instruction for a direct connection is performed, the CPU 201 attempts a connection to the MFP 110 by a direct connection in step S610 through step S613 without attempting a connection to the MFP 110 by an infrastructure connection. In this way, the CPU 201 attempts a connection to the MFP 110 by a direct connection without attempting a connection to the MFP 110 by an infrastructure connection if a connection by a direct connection to the connection destination MFP 110 is instructed by the user.

In a case where the processing is advanced from step S1001 to step S1002, the CPU 201 determines whether or not a connection history regarding a connection to the MFP 110 exists. Note, the connection history saved in step S1004 described later is stored in a storage device such as the HDD 204. The CPU 201 advances the processing to step S606 in a case where it determines that the connection history does not exist. In such a case, from step S606, first a connection to the MFP 110 by the infrastructure connection is attempted and if that fails, next a connection to the MFP 110 by the direct connection is attempted. Meanwhile, the CPU 201 advances the processing to step S1003 in a case where it determines that the connection history does exist.

In step S1003, the CPU 201 determines whether or not the saved connection history is a history of an infrastructure connection. The CPU 201 advances the processing to step S606 in a case where the connection history is a history of an infrastructure connection. In such a case, from step S606, first a connection to the MFP 110 by the infrastructure connection is attempted and if that fails, next a connection to the MFP 110 by the direct connection is attempted. Meanwhile, the CPU 201 advances the processing to step S610 in a case where the connection history is not a history of an infrastructure connection (a history of a direct connection). In such a case, a connection to the MFP 110 by direct connection is attempted without attempting a connection to the MFP 110 by infrastructure connection. In this way, the CPU 201 attempts a connection to the MFP 110 by a direct connection without attempting a connection to the MFP 110 by an infrastructure connection if history of a connection by a direct connection to the connection destination MFP 110 is stored in the HDD 204 or the like.

Step S610 through step S614 are the same as in the first embodiment. In the present embodiment, when a connection to the MFP 110 completes in step S609, step S613, or step S614, the CPU 201 saves a connection history regarding the connection to the MFP 110 in step S1104. The CPU 201 saves a connection history of direct connections in a case where it connects to the MFP 110 by a direct connection and saves a connection history of infrastructure connections in a case where it connects to the MFP 110 by an infrastructure connection. After this, the CPU 201 ends the connection processing.

As described above, by virtue of the present embodiment, in a case where reconnecting to an MFP for which there was a connection by a direct connection in the past, it is possible to enhance the probability that the connection can be performed in a shorter time by using a direct connection preferentially over an infrastructure connection. Also, in a case where the user clearly makes an instruction to start a direct connection, it is possible to perform a connection to the MFP by following the intention of the user.

Note, in the first and second embodiments, an example in which BT communication (including BLE communication) is performed as a proximity wireless communication between the mobile terminal 100 and the MFP 110 is illustrated. However, the first and second embodiments can be similarly applied in a case where another proximity wireless communication (NFC communication for example) is performed in place of BT communication.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-060904, filed Mar. 24, 2016, which is hereby incorporated by reference herein in its entirety.

What is claimed is:

1. A communication apparatus that performs an infrastructure connection for wireless connecting to an external apparatus through a wireless access point of a local area network and a direct connection for direct wireless connecting to the external apparatus, the communication apparatus comprising:
at least one memory storing instructions;
at least one processor executing the instructions to perform:
searching for devices;
displaying a list of devices discovered by the search;
attempting to perform the infrastructure connection to a device selected by a user in the displayed list; and
in a case where the infrastructure connection to the selected device fails, attempting to perform the direct connection to the selected device.

2. The communication apparatus according to claim 1, wherein
the communication apparatus comprises a first type of wireless communication function and a second type of wireless communication function,
the first type of wireless communication function is used to search for the devices, and
the second type of wireless communication function is used to perform the infrastructure connection and the direct connection.

3. The communication apparatus according to claim 2, wherein the at least one processor executes the instructions to further perform using the first type of the wireless communication function to obtain from the selected device connection information necessary for the infrastructure connection, wherein
the at least one processor attempts to perform the infrastructure connection to the selected device based on the obtained connection information.

4. The communication apparatus according to claim 3, wherein the connection information is an IP address of the selected device.

5. The communication apparatus according to claim 2, wherein
the first type of wireless communication function is a function for wireless communication by BLE and
the second type of the wireless communication function is a function for wireless communication by a WLAN method.

6. The communication apparatus according to claim 1, wherein in a case where the infrastructure connection to the selected device fails, the at least one processor executes the instructions to further perform:
instructing the selected device to start a direct wireless communication function; and
attempting to perform the direct connection to the selected device which has started the direct wireless communication function.

7. The communication apparatus according to claim 6, wherein in a case where the infrastructure connection to the selected device fails, the at least one processor executes the instructions to further perform instructing, by using a function for wireless connection by BLE, the selected device to start the direct wireless communication function.

8. The communication apparatus according to claim 1, wherein in a case where it has been instructed by a user to perform the direct connection, the at least one processor attempts to perform the direct connection to the selected device without attempting to perform the infrastructure connection to the selected device.

9. The communication apparatus according to claim 1, wherein the at least one processor executes the instructions to further perform storing a history of connection to a device,
wherein in a case where the history of connection indicates that the direct connection was performed to the selected device and that the infrastructure connection was not performed to the selected device, the at least one processor attempts to perform the direct connection to the selected device without attempting to perform the infrastructure connection to the selected device.

10. A method of controlling a communication apparatus that performs an infrastructure connection for wireless connecting to an external apparatus through a wireless access point of a local area network and a direct connection for direct wireless connecting to the external apparatus, the method comprising:

searching for devices;

displaying, on a screen of the communication apparatus, a list of devices discovered by the search;

attempting to perform the infrastructure connection to a device selected by a user in the displayed list; and in a case where the infrastructure connection to the selected device fails, attempting to perform the direct connection to the selected device.

11. The method according to claim 10, wherein the communication apparatus comprises a first type of wireless communication function and a second type of wireless communication function, the first type of wireless communication function is used to search for the devices, and the second type of wireless communication function is used to perform the infrastructure connection and the direct connection.

12. The method according to claim 11, further comprising using the first type of the wireless communication function to obtain from the selected device connection information necessary for the infrastructure connection, wherein the infrastructure connection to the selected device is attempted based on the obtained connection information.

13. The method according to claim 12, wherein the connection information is an IP address of the selected device.

14. The method according to claim 11, wherein the first type of wireless communication function is a function for wireless communication by BLE and the second type of the wireless communication function is a function for wireless communication by a WLAN method.

15. The method according to claim 10, further comprising, in a case where the infrastructure connection to the selected device fails, instructing the selected device to start a direct wireless communication function, wherein the direct connection is attempted to the selected device which has started the direct wireless communication function.

16. The method according to claim 15, further comprising, in a case where the infrastructure connection to the selected device fails, instructing, by using a function for wireless connection by BLE, the selected device to start the direct wireless communication function.

17. The method according to claim 10, wherein in a case where it has been instructed by a user to perform the direct connection, the direct connection to the selected device is attempted without attempting to perform the infrastructure connection to the selected device.

18. The method according to claim 10, further comprising storing a history of connection to a device, wherein in a case where the history of connection indicates that the direct connection was performed to the selected device and that the infrastructure connection was not performed to the selected device, the direct connection to the selected device is attempted without attempting to perform the infrastructure connection to the selected device.

19. A non-transitory computer-readable storage medium storing a computer program for causing a computer to execute a method of controlling a communication apparatus that performs an infrastructure connection for wireless connecting to an external apparatus through a wireless access point of a local area network and a direct connection for direct wireless connecting to the external apparatus, the method comprising:

searching for devices;

displaying, on a screen of the communication apparatus, a list of devices discovered by the search;

attempting to perform the infrastructure connection to a device selected by a user in the displayed list screen; and in a case where the infrastructure connection to the selected device fails, attempting to perform the direct connection to the selected device.

20. A communication apparatus that performs a first communication for wireless communicating with an external apparatus through a wireless access point of a local area network and a second communication for direct wireless communicating with the external apparatus, the communication apparatus comprising:

at least one memory storing instructions;

at least one processor executing the instructions to perform:

displaying a list of devices;

attempting to perform the first communication with a device selected by a user in the displayed list; and in a case where the first communication with the selected device fails, proceeding to a process for the second communication with the selected device.

21. The communication apparatus according to claim 20, wherein the communication apparatus further comprises a first type of wireless communication function and a second type of wireless communication function, and wherein the displayed list is a list of devices that is discovered by executing a search process using the first type of wireless communication function, and wherein the first communication and the second communication are performed using the second type of wireless communication function.

22. The communication apparatus according to claim 21, wherein the first type of wireless communication function is a function for wireless communication by BLE, and the second type of the wireless communication function is a function for wireless communication by a WLAN method.

23. The communication apparatus according to claim 20, wherein the process for the second communication includes attempting to perform the second communication with the selected device.

24. The communication apparatus according to claim 20, wherein the process for the second communication includes:

instructing the selected device to start a function of the second communication; and attempting to perform the second communication with the selected device which has started the function of the second communication.

25. A method of controlling a communication apparatus that performs a first communication for wireless communicating with an external apparatus through a wireless access point of a local area network and a second communication for direct wireless communicating with the external apparatus, the method comprising:

displaying a list of devices;

attempting to perform the first communication with a device selected by a user in the displayed list; and in a case where the first communication with the selected device fails, proceeding to a process for the second communication with the selected device.

26. The method according to claim 25, wherein the communication apparatus has a first type of wireless communication function and a second type of wireless communication function, and wherein the displayed list is a list of devices that is discovered by executing a search process using the first type of wireless communication function, and wherein the first communication and the second communication are performed using the second type of wireless communication function.

27. The method according to claim 26, wherein the first type of wireless communication function is a function for wireless communication by BLE, and the second type of the wireless communication function is a function for wireless communication by a WLAN method.

28. The method according to claim 25, wherein the process for the second communication includes attempting to perform the second communication with the selected device.

29. The communication apparatus according to claim 25, wherein the process for the second communication includes:

instructing the selected device to start a function of the second communication; and attempting to perform the second communication with the selected device which has started the function of the second communication.

30. A non-transitory computer-readable storage medium storing a computer program for causing a computer to execute a method of controlling a communication apparatus that performs a first communication for wireless communicating with an external apparatus through a wireless access point of a local area network and a second communication for direct wireless communicating with the external apparatus, the method comprising:

displaying a list of devices;

attempting to perform the first communication with a device selected by a user in the displayed list; and in a case where the first communication with the selected device fails, proceeding to a process for the second communication with the selected device.

* * * * *